United States Patent
Zhang et al.

(10) Patent No.: US 11,550,952 B1
(45) Date of Patent: Jan. 10, 2023

(54) ZERO-KNOWLEDGE PROOF METHOD AND ELECTRONIC DEVICE

(71) Applicants: ZHEJIANG UNIVERSITY, Zhejiang (CN); Hangzhou ABMatrix Technology Co., Ltd, Zhejiang (CN)

(72) Inventors: Bingsheng Zhang, Hangzhou (CN); Zhelei Zhou, Hangzhou (CN); Kui Ren, Hangzhou (CN); Jingzhong Xu, Hangzhou (CN); Kaiyu Lu, Hangzhou (CN)

(73) Assignees: ZHEJIANG UNIVERSITY, Hangzhou (CN); Hangzhou ABMatrix Technology Co., Ltd, Hangzhou (CN)

(*) Notice: Subject to any disclaimer, the term of this patent is extended or adjusted under 35 U.S.C. 154(b) by 0 days.

(21) Appl. No.: 17/751,646

(22) Filed: May 23, 2022

(30) Foreign Application Priority Data

Sep. 22, 2021 (CN) .......................... 202111105991.6

(51) Int. Cl.
*H04L 9/32* (2006.01)
*G06F 21/62* (2013.01)
*G06F 7/523* (2006.01)
*G06F 21/00* (2013.01)

(52) U.S. Cl.
CPC .......... *G06F 21/6245* (2013.01); *G06F 7/523* (2013.01); *H04L 9/3218* (2013.01)

(58) Field of Classification Search
CPC ..... G06F 7/523; G06F 21/6245; H04L 9/3218
See application file for complete search history.

(56) References Cited

U.S. PATENT DOCUMENTS

| 9,111,115 B2 * | 8/2015 | Camenisch | H04L 9/3073 |
| 9,356,783 B2 * | 5/2016 | Joye | H04L 9/3006 |
| 11,449,754 B1 * | 9/2022 | Zhuo | G06N 3/08 |
| 2009/0287926 A1 * | 11/2009 | Furukawa | H04L 9/3221 |
| | | | 713/168 |

(Continued)

FOREIGN PATENT DOCUMENTS

| CN | 104717067 A | 6/2015 |
| CN | 109104410 A | 12/2018 |
| CN | 113111373 A | 7/2021 |

OTHER PUBLICATIONS

CN First Office Action(202111105991.6); dated Nov. 9, 2021.

*Primary Examiner* — Gary S Gracia
(74) *Attorney, Agent, or Firm* — W&G Law Group

(57) ABSTRACT

Disclosed is a method and an apparatus a zero-knowledge proof and an electronic device. That method comprise the following steps: selecting a data processing relationship, and processing private data and public data to obtain a calculation result; respectively committing the private data and the calculation result according to a commitment parameter to obtain a first commitment value and a second commitment value, wherein the commitment parameter is generated by a trusted third party; generating a non-interactive zero-knowledge proof according to the data processing relationship; wherein the commitment parameter, the first commitment value and the second commitment value are used by a verifier to verify the non-interactive zero-knowledge proof. The present disclosure solves the technical problem that bilinear pairing cannot be used in the scenario where bilinear pairing cannot be used in related technologies.

4 Claims, 7 Drawing Sheets

---

Selecting one of two data processing relationships, namely a linear relationship and a generalized multiplication relationship, as the data processing relationship — S201

If the data processing relationship is a linear relationship, then the private data is $a_i$, the public data is $b_i$, and the data number of the private data and the public data is $n$, and the calculation result is $c = \sum_{i=1}^{n} a_i b_i$ — S202

If the data processing relationship is a generalized multiplication relationship, then the private data is $d_i, e_i$, the public data is $x_i, y_i$, the data number of the private data $d_i$ and the public data $x_i$ is $n_1$, and the data number of the private data and the public data $y_i$ is $n_2$, and the calculation result is $z = \sum_{i=1}^{n_1} d_i x_i \cdot \sum_{i=1}^{n_2} e_i y_i$ — S203

(56) References Cited

U.S. PATENT DOCUMENTS

| | | | |
|---|---|---|---|
| 2014/0237253 A1* | 8/2014 | Joye | H04L 9/3247 |
| | | | 713/176 |
| 2016/0080156 A1* | 3/2016 | Kaliski, Jr. | H04L 9/3247 |
| | | | 713/176 |
| 2016/0269416 A1* | 9/2016 | Camenisch | H04L 63/126 |
| 2017/0336205 A1* | 11/2017 | Thompson | G01P 15/123 |
| 2017/0366349 A1* | 12/2017 | Lyubashevsky | H04L 9/3218 |
| 2017/0366358 A1* | 12/2017 | Lyubashevsky | H04L 9/3221 |
| 2018/0034634 A1* | 2/2018 | Benarroch Guenun | |
| | | | H04L 9/3073 |
| 2018/0034636 A1* | 2/2018 | Benarroch Guenun | |
| | | | H04L 9/3073 |
| 2019/0103971 A1* | 4/2019 | Keuffer | H04L 9/3218 |
| 2019/0170786 A1* | 6/2019 | Thompson | G01P 15/133 |
| 2019/0244290 A1* | 8/2019 | Massacci | G06Q 40/04 |
| 2020/0007318 A1* | 1/2020 | Camenisch | H04L 9/3218 |
| 2020/0153627 A1* | 5/2020 | Wentz | H04L 9/3239 |
| 2020/0201679 A1* | 6/2020 | Wentz | G06F 9/5044 |
| 2020/0259651 A1* | 8/2020 | Mohassel | H04L 9/0643 |
| 2020/0320340 A1* | 10/2020 | Wentz | G06N 20/00 |
| 2020/0351098 A1* | 11/2020 | Wentz | H04L 9/3218 |
| 2020/0351657 A1* | 11/2020 | Wentz | H04L 9/3268 |

* cited by examiner

ZERO-KNOWLEDGE PROOF METHOD AND ELECTRONIC DEVICE

CROSS-REFERENCE TO RELATED APPLICATIONS

The present application claims priority to Chinese Patent Application No. 202111105991.6, filed on Sep. 22, 2021, the content of which is incorporated herein by reference in its entirety.

TECHNICAL FIELD

The present disclosure relates to the field of privacy protection data processing, in particular to zero-knowledge proof method and an electronic device.

BACKGROUND

Zero-knowledge proof is a proof solution that can make the verifier believe that a statement is true without revealing any additional information. Since the concept of zero-knowledge proof was put forward in 1980s, zero-knowledge proof has gradually become an important cryptographic tool and has been widely used. In 1988, the concept of non-interactive zero-knowledge proof was formally put forward, and the present disclosure scope of zero-knowledge proof was further broadened. Compared with interactive proof, non-interactive zero-knowledge proof solution has better properties: (1) better scalability: the interactive zero-knowledge proof solution only supports a pair of provers and verifiers, while the non-interactive zero-knowledge proof solution can support one prover and multiple verifiers; (2) better ease of use: the interactive zero-knowledge proof system requires both the certifier and the verifier to be online at the same time, while the interactive zero-knowledge proof solution allows the certifier to send the proof when the verifier is offline, and then makes verification when the verifier is online; (3) inconsistent initialization conditions: the non-interactive zero-knowledge proof system must have a third party (i.e. Setup) to complete the initialization, such as generating public parameters, but this condition is not necessary in the interactive zero-knowledge proof solution. Therefore, the non-interactive zero-knowledge proof is more widely used in various cryptographic tasks.

It is an important application to apply zero-knowledge proof to private data processing. In today's business environment, data is a major driving force for enterprise development. However, data is mobile and replicable, and can be copied in large quantities in a very short time. Therefore, all kinds of subjects in business activities have very high requirements for the privacy and security of data processing. At present, in view of the challenge of privacy protection data processing, researchers have proposed solutions such as trusted computing and full encryption of data, but there are obvious application bottlenecks. In 2020, in the Full Analysis Report of 3D Zero-knowledge Algorithm published by OneConnect Financial Technology Co. Ltd., a data processing method based on Schnorr Zero-knowledge Proof Protocol was proposed, which can verify the simple four operations of addition, subtraction, multiplication and division and the size relationship in the state of data ciphertext.

In the process of implementing the present disclosure, the inventor found that there are at least the following problems in the prior art: bilinear pairing is needed to verify multiplication and division operations, which means that this solution has limitations in practical applications, and it is not applicable in situations where bilinear pairing cannot be used; meanwhile, the computational cost of bilinear pairing is large, which means that the performance of this solution has a large room for improvement.

SUMMARY

The purpose of the embodiment of the present disclosure is to provide zero-knowledge proof method and an electronic device, so as to solve the technical problem that bilinear pairing cannot be used in the related technologies.

According to a first aspect of the embodiment of the disclosure, there is provided a zero-knowledge proof method applied to a proof sender, including the following steps of:

selecting a data processing relationship, and processing private data and public data to obtain a calculation result;

committing the private data and the calculation result according to a commitment parameter, respectively, to obtain a first commitment value and a second commitment value, the commitment parameter is generated by a trusted third party;

generating a non-interactive zero-knowledge proof according to the data processing relationship to enable a verifier to verify the non-interactive zero-knowledge proof according to the commitment parameter, the public data, the first commitment value and the second commitment value.

Furthermore, the method further includes sending the first commitment value, the second commitment value and the non-interactive zero-knowledge proof to a public data storage system, the commitment parameter is stored in the public data storage system by the trusted third party, and the public data is stored in the public data storage system.

Furthermore, the step of selecting a data processing relationship, and processing private data and public data to obtain a calculation result comprises:

selecting one relationship from two data processing relationships, namely a linear relationship and a generalized multiplication relationship, as the data processing relationship;

if the data processing relationship is a linear relationship, the private data is $a_i$, the public data is $b_i$, a number of data of the private data and the public data is n, and the calculation result is $$c = \sum_{i=1}^{n} a_i b_i;$$

if a generalized multiplication relation is selected, the private data is $d_i$, $e_i$, the public data is $x_i$, $y_i$, the number of data of the private data $d_i$ and the public data $x_i$ is $n_1$, the number of data of the private data $e_i$ and the public data $y_i$ is $n_2$, and the calculation result is $$z = \sum_{i=1}^{n_1} d_i x_i \cdot \sum_{i=1}^{n_2} e_i y_i.$$

Furthermore, the step of generating a non-interactive zero-knowledge proof according to the data processing relationship comprises:

generating an offset term according to the data processing relationship;

inputting the commitment parameter, the first commitment value, the second commitment value and the offset term into a random oracle machine to generate a challenge value according to the data processing relationship;

obtaining a response value by calculation according to the private data, the public data and the challenge value; and generating the non-interactive zero-knowledge proof according to the offset term and the response value.

Furthermore, the step of the verifier verifying the non-interactive zero-knowledge proof according to the commitment parameter, the public data, the first commitment value and the second commitment value comprises:

inputting the commitment parameter, the first commitment value, the second commitment value and the offset term into the random oracle machine to output the challenge value;

verifying the non-interactive zero-knowledge proof according to the public data, the first commitment value, the second commitment value and the challenge value.

According to a second aspect of the present disclosure, there is provided a zero-knowledge proof method applied to a verifier, including the following steps of:

acquiring a commitment parameter, public data, a first commitment value, a second commitment value and a non-interactive zero-knowledge proof, the commitment parameter is generated by a trusted third party; the first commitment value and the second commitment value are obtained by selecting, by a proof sender, a data processing relationship to process private data and public data to obtain a calculation result, and respectively committing the private data and the calculation result according to the commitment parameter; the non-interactive zero-knowledge proof is generated by the proof sender according to the data processing relationship;

verifying the non-interactive zero-knowledge proof according to the commitment parameter, the public data, the first commitment value and the second commitment value.

According to a third aspect of the present disclosure, there is provided an electronic device, including:

one or more processors;

a memory for storing one or more programs;

when the one or more programs are executed by the one or more processors, the one or more processors is caused to realize the method according to the first aspect.

The technical solution provided by the embodiment of the present disclosure can include the following beneficial effects.

It can be seen from the above embodiments that the data processing relationships involved in the present disclosure cover most of the data processing relationships, and can be widely applied to private data processing scenarios; according to the commitment parameter, the private data and the calculation result are committed to obtain the first commitment value and the second commitment value, making it impossible for the proof sender to modify the private data and calculation results afterwards, thus making forgery impossible and securing the protocol; a novel non-interactive zero-knowledge proof protocol without bilinear pairing is designed, which can support the proof sender to prove to the verifier that it has correctly processed private and public data. Because the designed protocol does not use bilinear pairing, it not only reduces the computational overhead, improves the efficiency, but also has a wider application space.

It should be understood that the above general description and the following detailed description are exemplary and explanatory only, and do not limit the present disclosure.

BRIEF DESCRIPTION OF DRAWINGS

The attached drawings, which are incorporated into and constitute a part of this description, illustrate embodiments consistent with the present disclosure and together with this description serve to explain the principles of the present disclosure.

DESCRIPTION OF EMBODIMENTS

Figure 1:
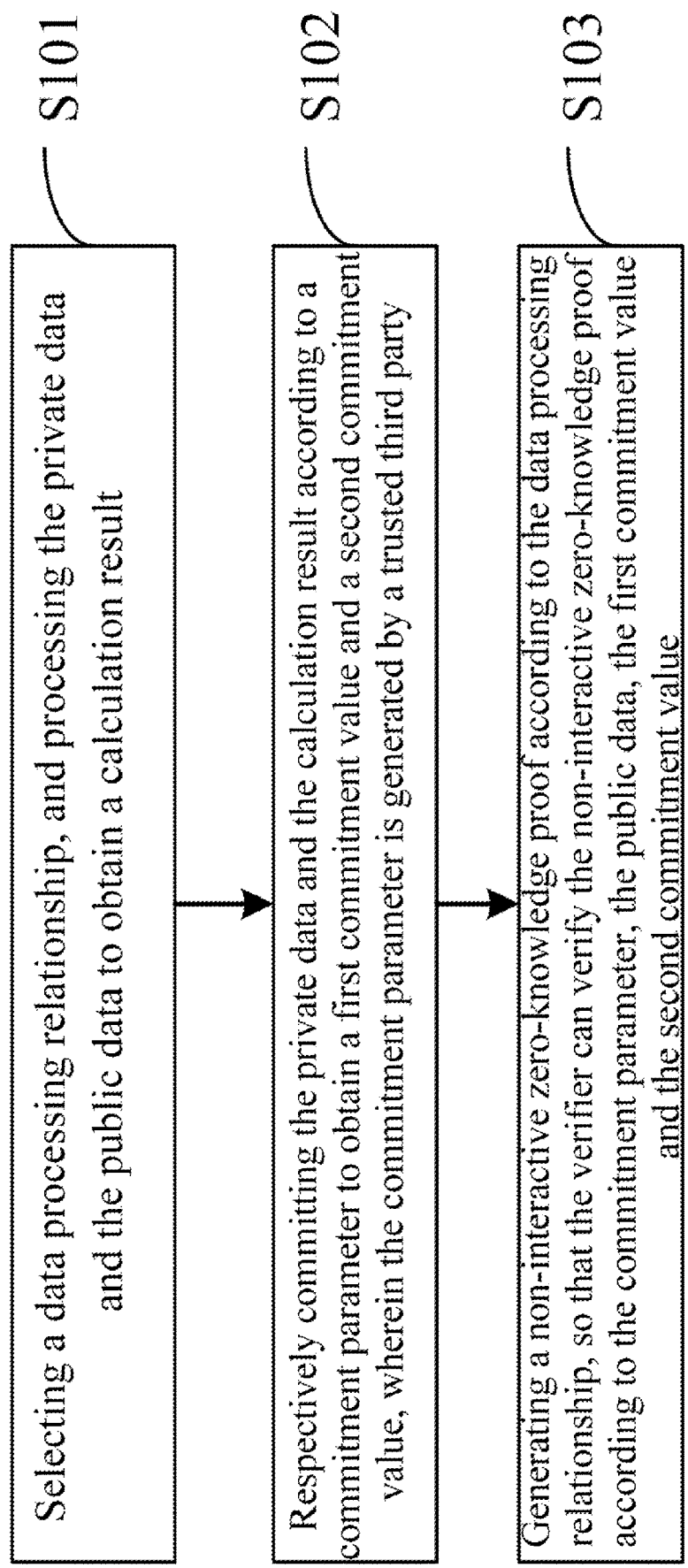
FIG. 1 is a flowchart of a zero-knowledge proof method (applied to a proof sender) according to an exemplary embodiment.

Exemplary embodiments will be described herein in detail, examples of which are represented in the attached drawings. Where the following description relates to the accompanying drawings, the same numerals in different accompanying drawings indicate the same or similar elements unless otherwise indicated. The embodiments described in the following exemplary embodiments do not represent all embodiments consistent with the present disclosure. Rather, they are only examples of devices and methods that are consistent with some aspects of the present disclosure as detailed in the appended claims.

The terms used in the present disclosure are intended to describe particular embodiments only and are not intended to limit the present disclosure. The singular forms of "a", "said" and "the" as used in the present disclosure and the appended claims are also intended to include most forms, unless the context clearly indicates other meaning. It should also be understood that the term "and/or" as used herein refers to and includes any or all possible combinations of one or more of the associated listed items.

It should be understood that while the terms "first", "second", "third", etc. may be used in the present disclosure to describe various types of information, such information should not be limited to these terms. These terms are used only to distinguish information of the same type from one another. For example, without departing from the scope of the present disclosure, first information may also be referred to as second information, and similarly, second information may also be referred to as first information. Depending on the context, for example, the word "if" as used herein may be interpreted as "at . . . " or "when . . . " or "in response to a determination".

The following is an explanation of the terms that appear in the text.

Private data: data that is held only by the proof sender, and the entire process does not disclose information about the private data to any other participants.

Public data: Data that is accessible to all participants.

Linear relationship: if the private data is $a_i$, the public data is $b_i$, the number of the private data and the public data is n, the calculation result is c, then the calculation result $$c = \sum_{i=1}^{n} a_i b_i$$

is obtained by linear combination of the private data and the public data, and we call this data processing relationship a linear relationship.

Generalized multiplication relationship: if the private data is $d_i$, $e_i$, the public data is $x_i$, $y_i$, the number of the private data $d_i$ and the public data $x_i$ is $n_1$, the number of the private data $e_i$ and the public data $y_i$ is $n_2$, and the calculation result is z, then the calculation result $$z = \sum_{i=1}^{n_1} d_i x_i \cdot \sum_{i=1}^{n_2} e_i y_i$$

is obtained by linearly combination of the private data and the public data followed by multiplication, and we call this data processing relation a generalized multiplication relation.

In the concrete implementation, linear relation or generalized multiplication relation can be selected as the data processing relation according to the requirements of the proof initiator.

Suppose that a MINE A needs to share data with a MNE B for business development, but because business data is highly confidential, the MNE A and MNE B cannot directly disclose their business data due to data security and their own business interests, but they want to use their business data for data linkage and mutual verification. In order to achieve the above requirements, the MNE A and MNE B can use the zero-knowledge proof method shown below to complete data processing and verification.

FIG. 1 is a flow chart of a zero-knowledge proof method (applied to a proof sender) according to an exemplary embodiment. As shown in FIG. 1, the method applied to the proof sender may include the following steps:

S101, selecting a data processing relationship, and processing the private data and the public data to obtain a calculation result;

S102, respectively committing the private data and the calculation result according to a commitment parameter to obtain a first commitment value and a second commitment value, the commitment parameter is generated by a trusted third party;

S103, generating a non-interactive zero-knowledge proof according to the data processing relationship, so that the verifier can verify the non-interactive zero-knowledge proof according to the commitment parameter, the public data, the first commitment value and the second commitment value.

It can be seen from the above embodiments that the data processing relationships involved in the present disclosure covers most of the data processing relationships, and can be widely applied to private data processing scenarios; according to the commitment parameter, the private data and the calculation result are committed to obtain the first commitment value and the second commitment value, making it impossible for the proof sender to modify the private data and calculation results afterwards, thus making forgery impossible and securing the protocol. A novel non-interactive zero-knowledge proof protocol without bilinear pairing is designed, which can support the proof sender to prove to the verifier that it has correctly processed private and public data. Because the designed protocol does not use bilinear pairing, it not only reduces the computational overhead, improves the efficiency, but also has a wider application space.

Figure 2:
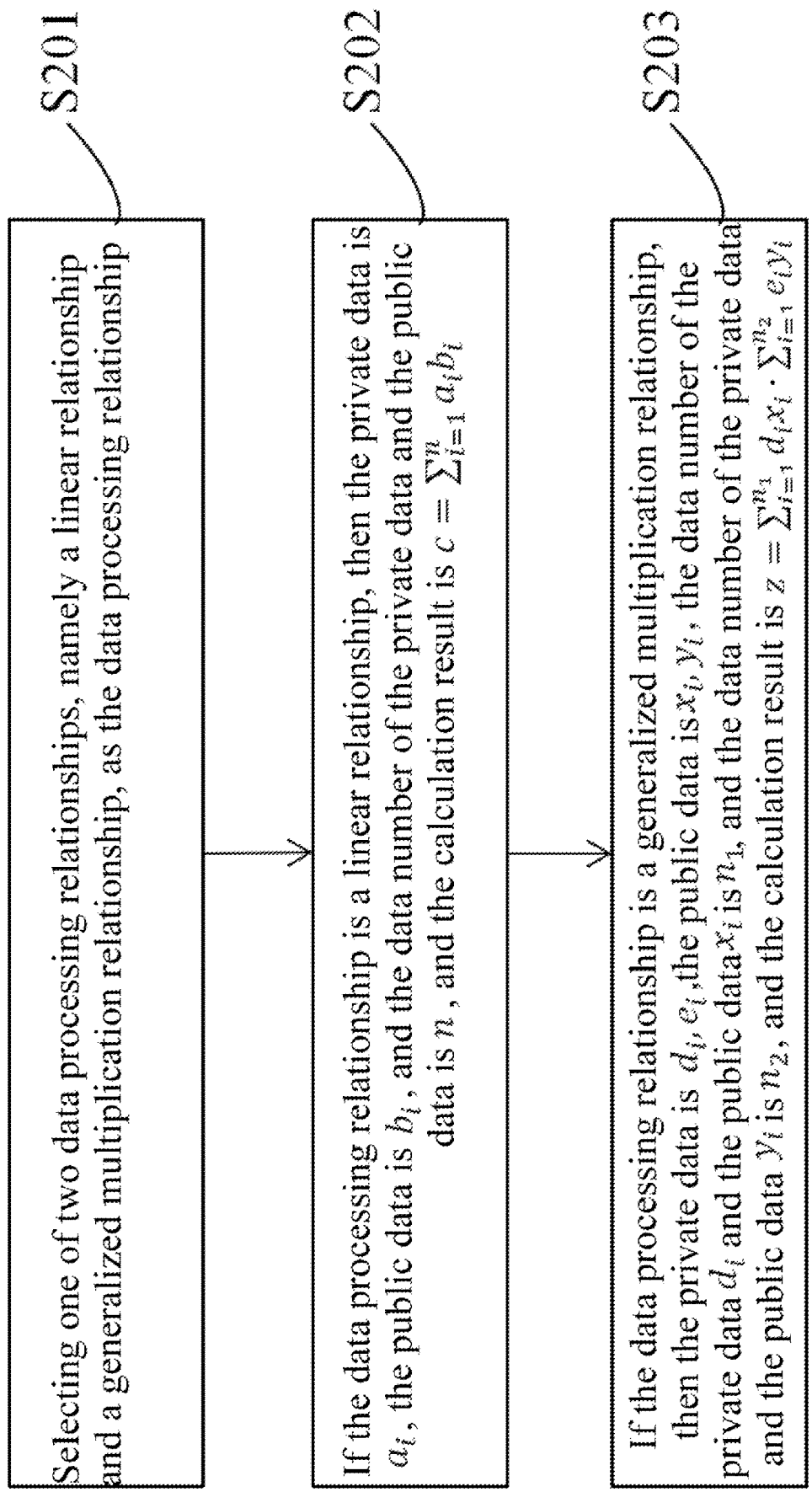
FIG. 2 is a flowchart of step S101 according to an exemplary embodiment.

In the specific implementation of step S101, the data processing relationship is selected, and the private data and public data are processed to obtain the calculation result; specifically, as shown in FIG. 2, this step includes the following substeps:

S201, selecting one of two data processing relationships, namely a linear relationship and a generalized multiplication relationship, as the data processing relationship;

Specifically, it is proved that the sender should choose the appropriate data processing relationship according to the actual business scenario requirements, because different data processing relationships have different practices in the subsequent steps. The advantage by dosing so is that different data processing relationships have different targeted solutions, which can greatly improve the efficiency.

S202, if the data processing relationship is a linear relationship, then the private data is $a_i$, the public data is $b_i$, and the data number of the private data and the public data is n, and the calculation result is $$c = \sum_{i=1}^{n} a_i b_i;$$

specifically, the proof sender linearly combines the private data $a_i$ and the public data $b_i$ to obtain the calculation result c, and the specific calculation expression is $$c = \sum_{i=1}^{n} a_i b_i;$$

the advantage of this is that the linear relationship can cover addition and subtraction, for example when n=2, $b_1=b_2=1$, we got an addition operation $c=a_1+a_2$, while when n=2, $b_1=1$, $b_2=-1$, we got a subtraction operation $c=a_1-a_2$.

S203, if the data processing relationship is a generalized multiplication relationship, then the private data is $d_i$, $e_i$, the public data is $x_i$, $y_i$, the data number of the private data $d_i$ and the public data $x_i$ is $n_1$, and the data number of the private data $e_i$ and the public data $y_i$ is $n_2$, and the calculation result is $$z = \sum_{i=1}^{n_1} d_i x_i \cdot \sum_{i=1}^{n_2} e_i y_i;$$

Specifically, the proof sender performs linear processing and multiplication on private data $d_i$, $e_i$ and public data $x_i$, $y_i$ to obtain the calculation result z, and the specific calculation expression is $$z = \sum_{i=1}^{n_1} d_i x_i \cdot \sum_{i=1}^{n_2} e_i y_i;$$

the advantage of this is that multiplication can be covered by the generalized multiplication relationship, for example when $n_1=n_2=1$, $x_1=y_1=1$, we got a multiplication operation $z=d_1 \cdot e_1$.

Figure 3:
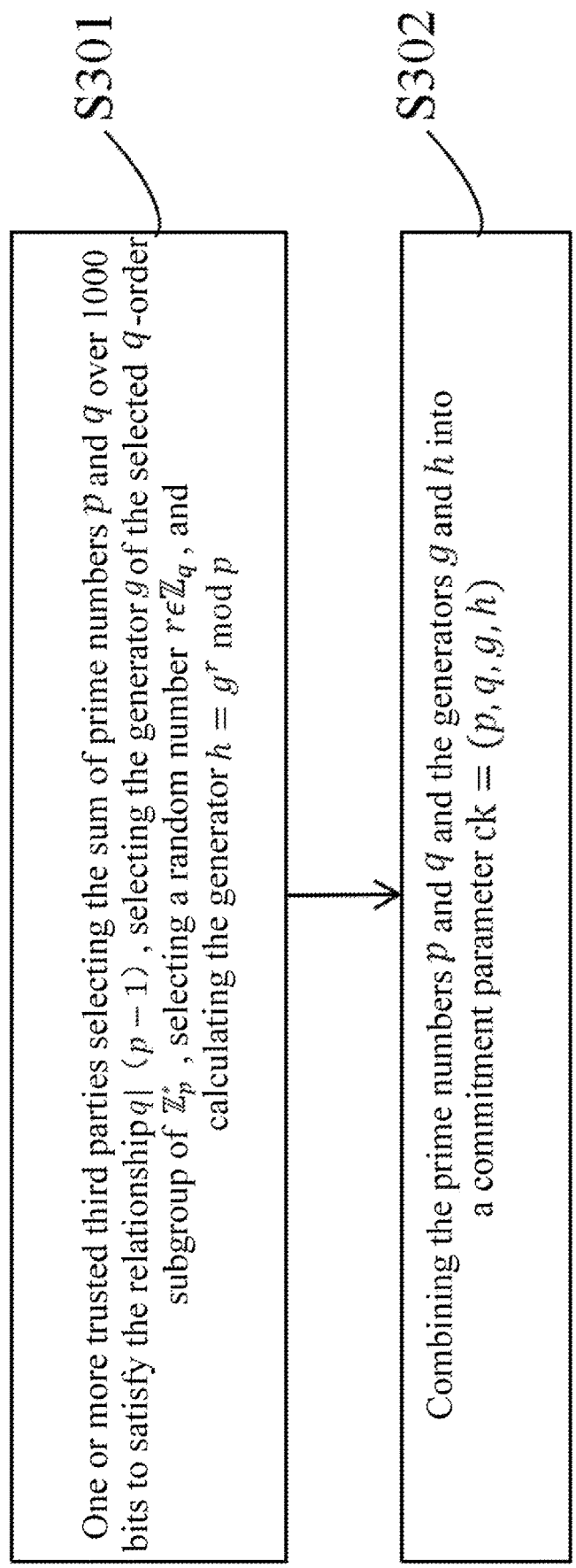
FIG. 3 is a flowchart of step S102 according to an exemplary embodiment.

In the specific implementation of step S102, the private data and the calculation result are respectively committed according to the commitment parameter, and a first commitment value and a second commitment value are obtained, the commitment parameter is generated by a trusted third party;

as shown in FIG. 3, the generation steps of the commitment parameter include:

S301, one or more trusted third parties selecting the sum of prime numbers p and q over 1000 bits to satisfy the relationship $q|(p-1)$, selecting the generator g of the selected q-order subgroup of $\mathbb{Z}^*_p$, selecting a random number $r \in \mathbb{Z}_q$, and calculating the generator $h=g^r \bmod p$;

Specifically, one or more trusted third parties randomly select a prime number q greater than 1000 bits, and then test whether $q \cdot k+1$ is a prime number starting from $k=1$; if not, the test of k plus 1 (i.e. $k=k+1$) is repeated until a prime number is obtained, which is recorded as p; the prime number p and q satisfy the relation $q|(p-1)$; after the prime numbers p and q are obtained, a generator g is randomly selected from the q-order subgroup of $\mathbb{Z}^*_p$, and then a random number $r \in \mathbb{Z}_q$ is selected to calculate the generator $h=g^r \bmod p$; the advantage of this is that choosing prime numbers larger than 1000 bits can ensure that existing commercial computers cannot break the commitment value by enumerating; selecting two generators can better guarantee the security of the commitment solution.

S302, combining the prime numbers p and q and the generators g and h into a commitment parameter $ck=(p, q, g, h)$;

Specifically, one or more trusted third parties secretly store a random number r, combine the prime numbers p and q and the generators g and h into a commitment parameter $ck=(p, q, g, h)$, and then proof sender can generate the first commitment value and the second commitment value through the commitment parameter ck; the advantage of this is that secret storage of the random number r makes it impossible for attackers to crack the relationship between generators g and h, and then to break the commitment value.

Further, the process of commitment is as follows:

if the data processing relationship is a linear relationship, a random number $\forall i \in \{1, \ldots, n\}$, $\alpha_i, \gamma \in \mathbb{Z}_q$ is selected and $\forall i \in \{1, \ldots, n\}$, $[a_i]=g^{\alpha_i}h^{a_i}$, $[c]=g^c h^\gamma$ is calculated, $([a_1], \ldots, [a_n])$ is a first commitment value and $[c]$ is the second commitment value.

Specifically, the proof sender selects a random number $\forall i \in \{1, \ldots, n\}$, $\alpha_i, \gamma \in \mathbb{Z}_q$ and then calculates $\forall i \in \{1, \ldots, n\}$, $[a_i]=g^{\alpha_i}h^{a_i}$, $[c]=g^c h^\gamma$ according to the commitment parameter ck; the proof sender combines $[a_1], \ldots, [a_n]$ into the first commitment value, and takes $[c]$ as the second commitment value.

If the data processing relationship is a generalized multiplication relationship, a random number $\forall i \in \{1, \ldots, n\}$, $\delta_i, \varepsilon_i, \zeta \in \mathbb{Z}_q$ is Selected and $\forall i \in \{1, \ldots, n\}$, $[d_i]=g^{d_i}h^{\delta_i}$, $[e_i]=g^{e_i}h^{\varepsilon_i}$, $[z]$ $g^z h^\zeta$ is calculated, $([d_1], \ldots, [d_n], [e_1], \ldots, [e_n])$ is the first commitment value and $[z]$ is the second commitment value.

Specifically, the proof sender selects a random number $\forall i \in \{1, \ldots, n\}$, $\delta_i, \varepsilon_i, \zeta \in \mathbb{Z}_q$ and then calculates $\forall i \in \{1, \ldots, n\}$, $[d_i]=g^{d_i}h^{\delta_i}$, $[e_i]=g^{e_i}h^{\varepsilon_i}$, $[z]=g^z h^\zeta$ according to the commitment parameter ck; the proof sender combines $[d_1], \ldots, [d_n], [e_1], \ldots, [e_n]$ into the first commitment value, and takes $[z]$ as the second commitment value.

The advantage of this is that after the proof sender has committed the private data and calculation result, they cannot be modified afterwards, avoiding the possibility of forgery of the proof sender; at the same time, the verifier has no way to distinguish between the first commitment value (or the second commitment value) and the random number, i.e., the first commitment value and the second commitment value do not reveal information about the private data and calculation result.

Figure 4:
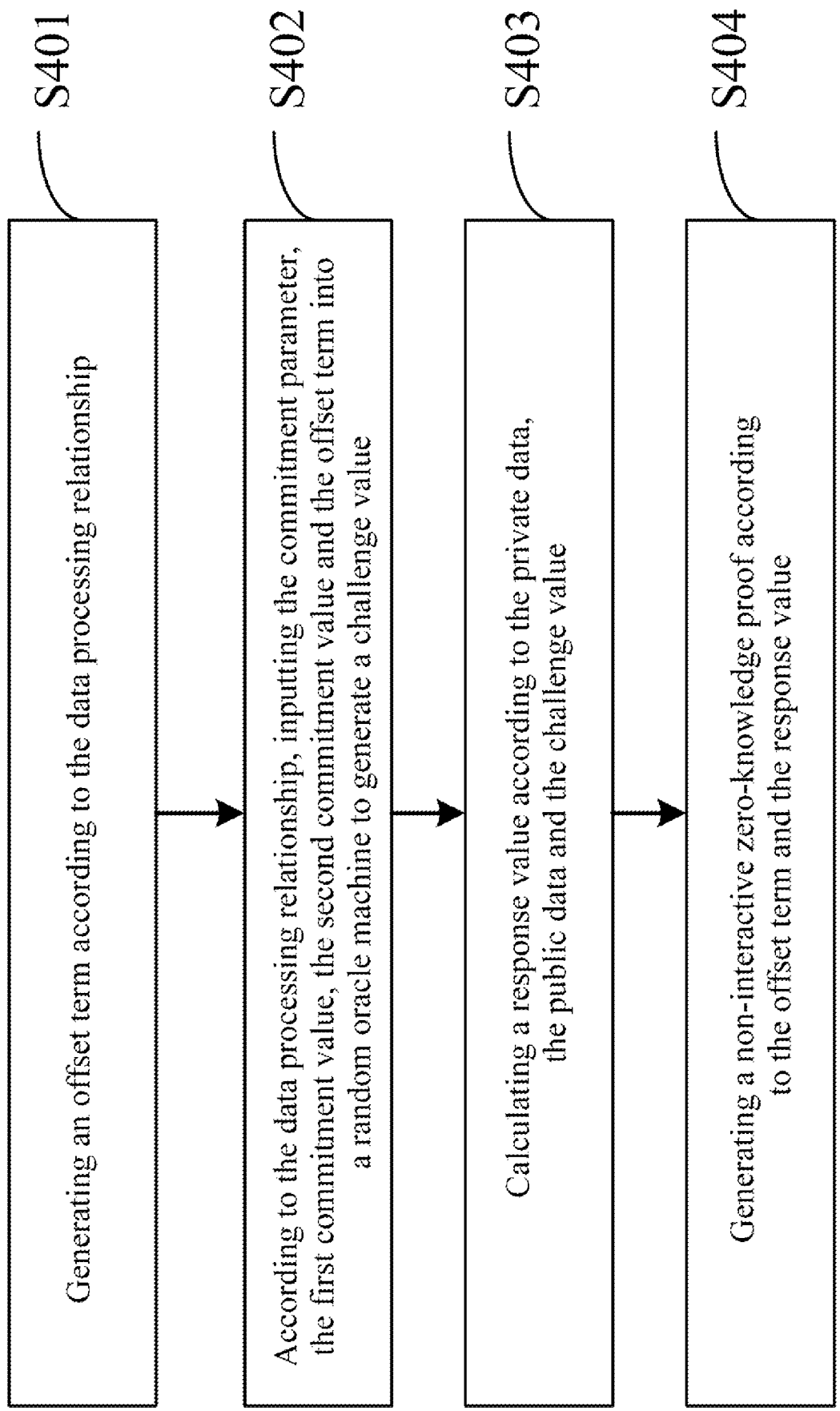
FIG. 4 is a flowchart of step S103 according to an exemplary embodiment.

In the specific implementation of step S103, according to the data processing relationship, a non-interactive zero-knowledge proof is generated, so that the verifier can verify the non-interactive zero-knowledge proof according to the commitment parameter, the public data, the first commitment value and the second commitment value; specifically, as shown in FIG. 4, this step includes the following substeps:

S401, generating an offset term according to the data processing relationship;

Specifically, if the data processing relationship is linear, the proof sender selects a random number $s_1 \in \mathbb{Z}_q$ and calculates the offset term $D_1=h^{s_1}$.

If the data processing relation is a generalized multiplication relation, the proof sender selects a random number $s_2$, $s_3, s_4 \in \mathbb{Z}_q$ and calculates an offset term $$D_2 = \left(\prod_{i=1}^{n_1}[d_i]^{x_i}\right)^{s_2} h^{s_3}, D_3 = g^{s_2}h^{s_4}.$$

The advantage of this is that the proof sender will use random numbers to protect private data and calculation result from leakage in the subsequent process, so the proof sender selects a random number at the beginning and uses the random number to generate an offset term, which can be used for verification by the verifier.

S402, according to the data processing relationship, inputting the commitment parameter, the first commitment value, the second commitment value and the offset term into a random oracle machine to generate a challenge value;

Specifically, if the data processing relationship is a linear relationship, the proof sender calls the random oracle machine $\mathcal{O}$, inputs $(g, h, [a_1], \ldots, [a_n], [c], D_1)$ and gets an output challenge value $\rho_1$.

If the data processing relation is a generalized multiplication relation, the proof sender calls the random oracle machine $\mathcal{O}$, inputs $(g, h, [d_1], \ldots, [d_n], [e_1], \ldots, [e_n], [z], D_2, D_3)$ and gets an output challenge value $\rho_2$.

The advantage of this is that the proof sender calls the random oracle machine $\mathcal{O}$ to get the challenge value, which can make the proof generation process non-interactive. Because of the ease of use and expandability, non-interactive zero-knowledge proof is more widely used than the interactive zero-knowledge proof.

S403: calculating a response value according to the private data, the public data and the challenge value;

Specifically, if the data processing relationship is a linear relationship, the proof sender calculates the response value $$u_1 = s_1 + \rho_1 \cdot \left(\sum_{i=1}^n \alpha_i b_i - \gamma\right)$$

according to the private data, the public data and the challenge value.

If the data processing relationship is a generalized multiplication relationship the proof sender calculates the response value according to the private data, public data and challenge value:

$$u_2 = s_2 + \rho_2 \cdot \sum_{i=1}^{n_2} e_i y_i$$

$$u_3 = s_4 + \rho_2 \cdot \sum_{i=1}^{n_2} \varepsilon_i y_i$$

$$u_4 = s_3 + \rho_2 \cdot \left( \zeta - \sum_{i=1}^{n_1} \delta_i x_i \cdot \sum_{i=1}^{n_2} e_i y_i \right)$$

The advantage of this is that since a random number is added, the proof sender hides the private data in the response value, that is, the verifier cannot deduce the private data from the response value, thus protecting the security of the private data. At the same time, the response value can be used for final verification.

S404, generating a non-interactive zero-knowledge proof according to the offset term and the response value.

Specifically, if the data processing relationship is a linear relationship, the proof sender generates a non-interactive zero-knowledge proof $\pi_1 := (D_1, u_1)$.

If the data processing relation is a generalized multiplication relation, the proof sender generates a non-interactive zero-knowledge proof $\pi_2 := (D_2, D_3, u_2, u_3, u_4)$.

The advantage of this is that no matter how many private data and public data are needed, the size of the non-interactive zero-knowledge proof that the proof sender finally sends is fixed, and the communication volume is very small, so the efficiency is very high. At the same time, the generation process of the non-interactive zero-knowledge proof does not need bilinear pairing.

Figures 5, 6:
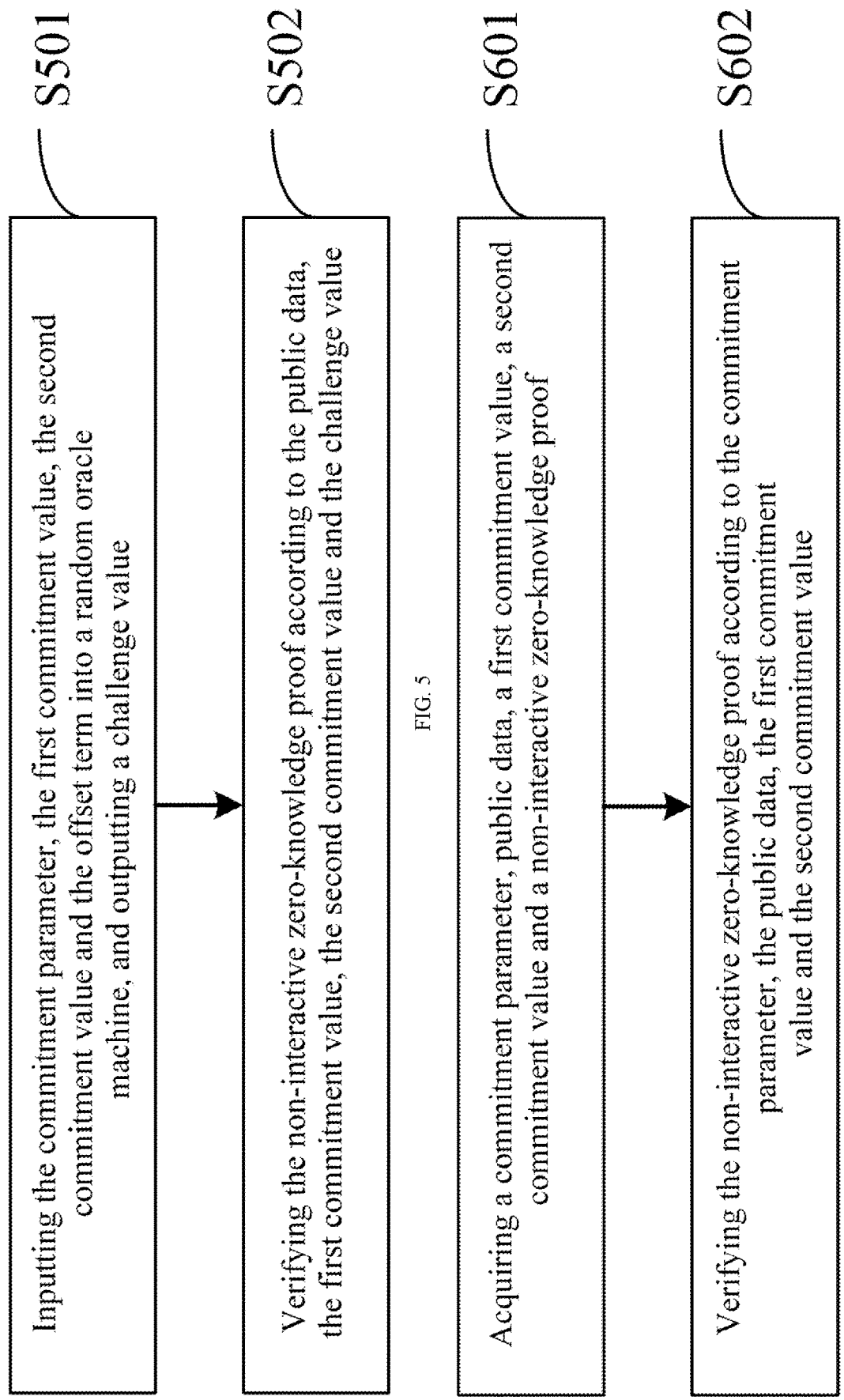
FIG. 5 is a flowchart of the steps of verifying by the verifier according to an exemplary embodiment.
FIG. 6 is a flowchart of a zero-knowledge proof method (applied to the verifier) according to an exemplary embodiment.

Specifically, as shown in FIG. 5, verifying the non-interactive zero-knowledge proof by the verifier according to the commitment parameter, the public data, the first commitment value and the second commitment value in step S103 includes the following steps:

S501: inputting the commitment parameter, the first commitment value, the second commitment value and the offset term into a random oracle machine, and outputting a challenge value;

Specifically, if the data processing relationship is a linear relationship, the proof sender calls the random oracle machine $\mathcal{O}$, inputs (g, h, [$a_1$], ..., [$a_n$], [c], $D_1$) and gets an output challenge value $\rho_1$.

If the data processing relation is a generalized multiplication relation, the proof sender calls the random oracle machine $\mathcal{O}$, inputs (g, h, [$d_1$], ..., [$d_n$], [$e_1$], ..., [$e_n$], [z], $D_2$, $D_3$) and gets an output challenge value $\rho_2$.

The advantage of this is that the verifier can get the challenge value by calling the random oracle machine, thus avoiding having the proof sender send the challenge value and reducing the amount of communication.

S502, verifying the non-interactive zero-knowledge proof according to the public data, the first commitment value, the second commitment value and the challenge value.

Specifically, if the data processing relationship is a linear relationship, the verifier verifies $$D_1 \cdot \left( \prod_{i=1}^{n} [a_i]^{b_i} / [c] \right)^{\rho_1} = h^{u_1};$$

if the data processing relationship is a generalized multiplication relationship, the verifier verifies $$D_2 \cdot ([z])^{\rho_2} = \left( \prod_{i=1}^{n} [d_i]^{x_i} \right)^{u_2} h^{u_4} \text{ and } D_3 \cdot \left( \prod_{i=1}^{n_2} [e_i]^{y_i} \right)^{\rho_2} = g^{u_2} h^{u_3};$$

The advantage of this is that no matter how many private data and public data are needed, the equation that the verifier needs to verify is fixed, and the verification process of the non-interactive zero-knowledge proof does not need bilinear pairing.

During the implementation of step S101-step S103, the first commitment value, the second commitment value and the non-interactive zero-knowledge proof can also be sent to the public data storage system, where the commitment parameter is saved by a trusted third party and the public data is stored.

FIG. 6 is a flowchart of a zero-knowledge proof method (applied to the verifier) according to an exemplary embodiment. As shown in FIG. 6, the method applied to the verifier may include the following steps:

S601: acquiring a commitment parameter, public data, a first commitment value, a second commitment value and a non-interactive zero-knowledge proof, the commitment parameter is generated by a trusted third party; the first commitment value and the second commitment value are obtained by selecting, by a proof sender, a data processing relationship to process private data and public data to obtain a calculation result, and respectively committing the private data and the calculation result according to the commitment parameter; the non-interactive zero-knowledge proof is generated by the proof sender according to the data processing relationship;

Specifically, the verifier downloads from a public data storage system or receives the commitment parameter, the first commitment value, the second commitment value and the non-interactive zero-knowledge proof from the proof sender.

S602: verifying the non-interactive zero-knowledge proof according to the commitment parameter, the public data, the first commitment value and the second commitment value;

Specifically, the verification process is as described in step S501-step S502 above.

Figure 7:
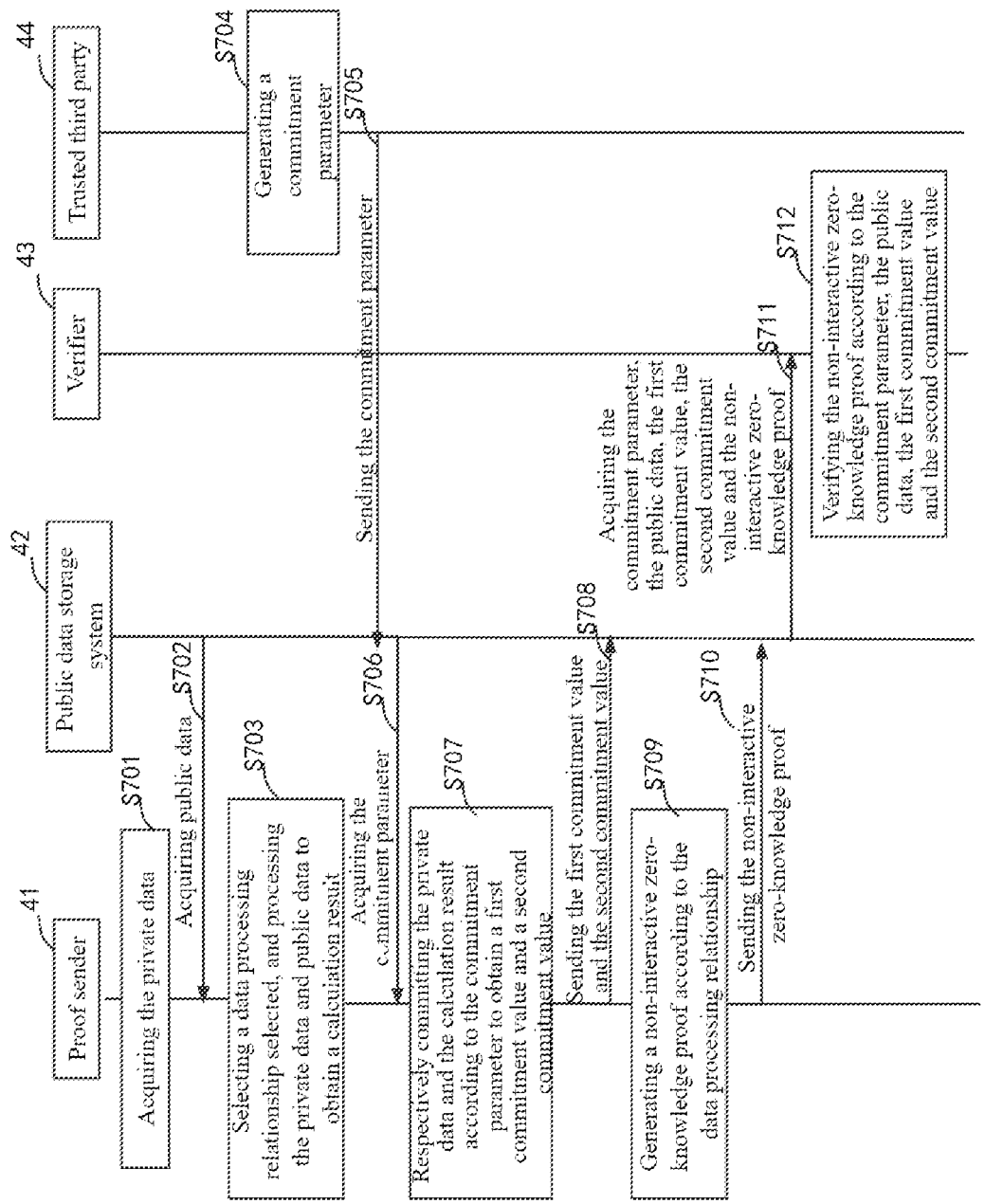
FIG. 7 is a data flow diagram of a zero-knowledge proof method according to an exemplary embodiment.

Referring to FIG. 7, FIG. 7 is a data flow diagram of a zero-knowledge proof method in an embodiment of the present disclosure. The zero-knowledge proof method can be used to a proof sender 41, a public data storage system 42, a verifier 43 and a trusted third party 44, and can also include steps S701 to S712, which are described below.

S701: the proof sender 41 acquiring the private data;

S702: the proof sender 41 acquiring public data from the public data storage system 42;

S703: the proof sender 41 selecting a data processing relationship selected, and processing the private data and public data to obtain a calculation result;

S704: the trusted third party 44 generating a commitment parameter;

S705: the trusted third party 44 sending the commitment parameter to the public data storage system 42;

S706: the proof sender 41 acquiring the commitment parameter from the public data storage system 42;

S707: the proof sender 41 respectively committing the private data and the calculation result according to the commitment parameter to obtain a first commitment value and a second commitment value;

S708: the proof sender 41 sending the first commitment value and the second commitment value to the public data storage system 42;

S709: the proof sender 41 generating a non-interactive zero-knowledge proof according to the data processing relationship;

S710: the proof sender 41 sending the non-interactive zero-knowledge proof to the public data storage system 42;

S711: the verifier 43 acquiring the commitment parameter, the public data, the first commitment value, the second commitment value and the non-interactive zero-knowledge proof from the public data storage system 42;

S712: the verifier 43 verifying the non-interactive zero-knowledge proof according to the commitment parameter, the public data, the first commitment value and the second commitment value.

In the specific implementation, please refer to the previous description and the description of FIGS. 1 to 6 for more details about step S701 to step S712, which will not be repeated here.

Corresponding to the aforementioned embodiment of the zero-knowledge proof method, the present disclosure also provides an embodiment of a zero-knowledge proof apparatus.

Figure 8:
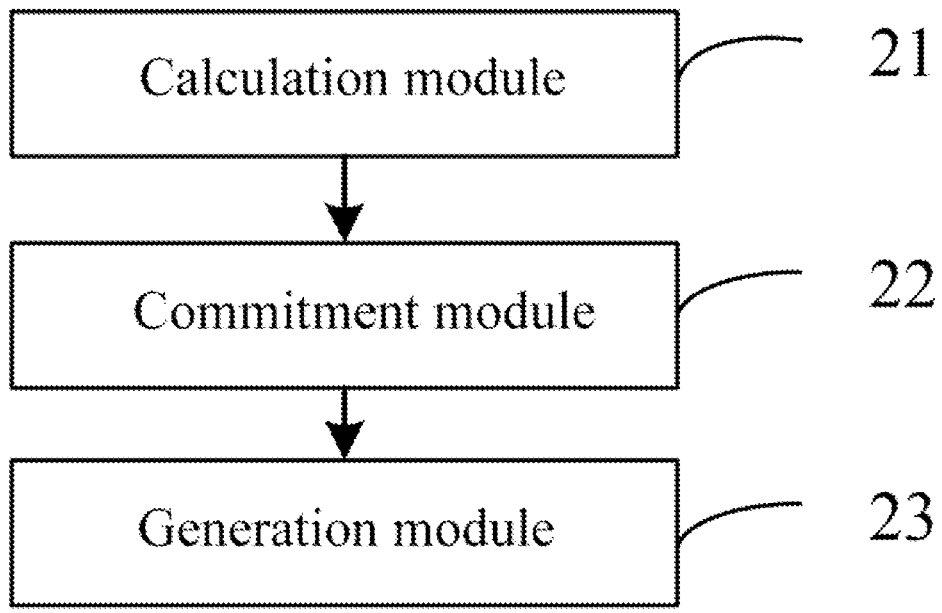
FIG. 8 is a block diagram of a zero-knowledge proof apparatus (applied to the proof sender) according to an exemplary embodiment.

FIG. 8 is a block diagram of a zero-knowledge proof apparatus (applied to a proof sender) according to an exemplary embodiment. Referring to FIG. 7, applied to proving a sender, the apparatus includes:

a calculation module 21, which selects a data processing relationship and processes the private data and the public data to obtain a calculation result;

a commitment module 22, which respectively commits the private data and the calculation result according to a commitment parameter, and obtains a first commitment value and a second commitment value, the commitment parameter is generated by a trusted third party;

a generation module 23, which generates a non-interactive zero-knowledge proof according to the data processing relationship, so that the verifier can verify the non-interactive zero-knowledge proof according to the commitment parameter, the public data, the first commitment value and the second commitment value.

Figure 9:
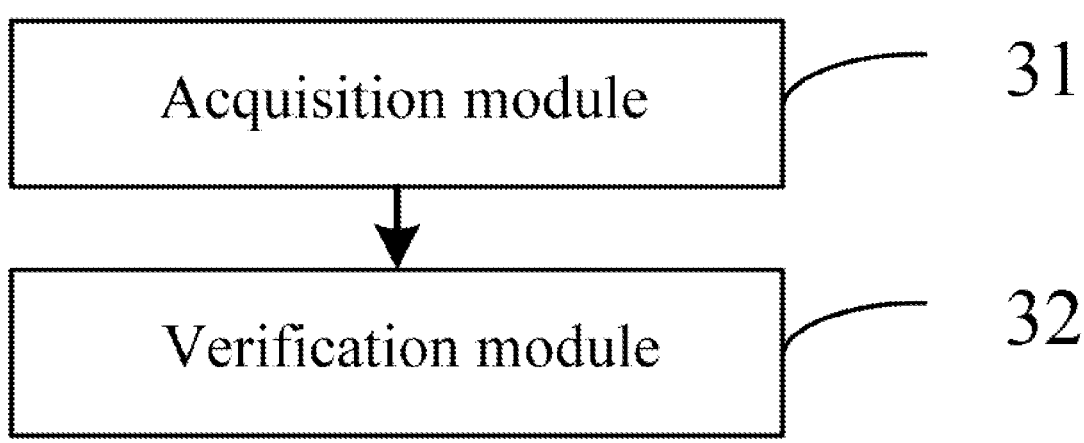
FIG. 9 is a block diagram of a zero-knowledge proof apparatus (applied to the verifier) according to an exemplary embodiment.

FIG. 9 is a block diagram of a zero-knowledge proof apparatus (applied to the verifier) according to an exemplary embodiment. Referring to FIG. 9, applied to the verifier, the apparatus includes:

an acquisition module 31, which acquires a commitment parameter, public data, a first commitment value, a second commitment value and a non-interactive zero-knowledge proof, the commitment parameter is generated by a trusted third party; the first commitment value and the second commitment value are obtained by selecting, by a proof sender, a data processing relationship to process private data and public data to obtain a calculation result, and respectively committing the private data and the calculation result according to the commitment parameter; the non-interactive zero-knowledge proof is generated by the proof sender according to the data processing relationship;

a verification module 32, which verifies the non-interactive zero-knowledge proof according to the commitment parameter, the public data, the first commitment value and the second commitment value.

With regard to the apparatus in the above embodiment, the specific way in which each module performs the operation has been described in detail in the embodiments related to the method, and will not be explained in detail here.

As for the apparatus embodiment, as it basically corresponds to the method embodiment, it is sufficient to refer to the method embodiment for the relevant part of the description. The embodiment of the apparatus described above is only schematic, in which the units described as separate components may or may not be physically separated, and the components displayed as units may or may not be physical units, that is, they may be located in one place or distributed to multiple network units. Some or all of the modules can be selected according to the actual needs to achieve the purpose of the present disclosure. It can be understood and implemented by one in the art without creative work.

Correspondingly, the present disclosure also provides an electronic device, which includes one or more processors; a memory for storing one or more programs; when the one or more programs are executed by the one or more processors, the one or more processors realize the zero-knowledge proof method as described above.

Correspondingly, the present disclosure also provides a computer-readable storage medium on which computer instructions are stored, when the instructions are executed by the processor, the zero-knowledge proof method as described above is realized.

Other embodiments of the present disclosure will readily come to the mind of one skilled in the art upon consideration of the specification and practice of what is disclosed herein. The present disclosure is intended to cover any variations, uses, or adaptations of this application that follows the general principles of this application and includes commonly known or customary technical means in the art that are not disclosed herein. The description and embodiments are to be considered exemplary only, and the true scope and spirit of the present disclosure is indicated by the following claims.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

It should be understood that the present disclosure is not limited to the precise structure described above and shown in the drawings, and various modifications and changes can be made without departing from its scope. The scope of the present disclosure is limited only by the appended claims.

What is claimed is:

1. An electronic device, comprising:
   one or more processors; and
   a memory for storing one or more programs;
   wherein when the one or more programs are executed by the one or more processors, the one or more processors is caused to realize a zero-knowledge proof method applied to a proof sender, comprising the following steps of:
   selecting a data processing relationship, and processing private data and public data to obtain a calculation result;
   committing the private data and the calculation result, respectively, according to a commitment parameter to obtain a first commitment value and a second commitment value, wherein the commitment parameter is generated by a trusted third party; and
   generating a non-interactive zero-knowledge proof according to the data processing relationship to enable a verifier to verify the non-interactive zero-knowledge proof according to the commitment parameter, the public data, the first commitment value and the second commitment value;
   wherein the step of selecting a data processing relationship, and processing private data and public data to obtain a calculation result comprises:
   selecting one relationship from two data processing relationships, namely a linear relationship and a generalized multiplication relationship, as the data processing relationship;
   wherein when the data processing relationship is a linear relationship, the private data is $a_i$, the public data is $b_i$, a number of data of the private data and the public data is n, and the calculation result is $c=\Sigma^{n}_{i=1} a_i b_i$; and
   wherein when a generalized multiplication relation is selected, the private data is $d_i$, $e_i$, the public data is $x_i$, $y_i$, the number of data of the private data $d_i$ and the public data $x_i$ is $n_1$, the number of data of the private data $e_i$ and the public data $y_i$, is $n_2$, and the calculation result is $z=\Sigma^{n1}_{i=1} d_i x_i \cdot \Sigma^{n2}_{i=1} e_i y_i$;
   the step of generating a non-interactive zero-knowledge proof according to the data processing relationship comprises:
   generating an offset term according to the data processing relationship;
   inputting the commitment parameter, the first commitment value, the second commitment value and the offset term into a random oracle machine to generate a challenge value according to the data processing relationship;
   obtaining a response value by calculation according to the private data, the public data and the challenge value; and generating the non-interactive zero-knowledge proof according to the offset term and the response value.

2. The method according to claim 1, further comprising:
   sending the first commitment value, the second commitment value and the non-interactive zero-knowledge proof to a public data storage system, wherein the commitment parameter is stored in the public data storage system by the trusted third party, and the public data is stored in the public data storage system.

3. The method according to claim 1, wherein the step of the verifier verifying the non-interactive zero-knowledge proof according to the commitment parameter, the public data, the first commitment value and the second commitment value comprises:
   inputting the commitment parameter, the first commitment value, the second commitment value and the offset term into the random oracle machine to output the challenge value; and
   verifying the non-interactive zero-knowledge proof according to the public data, the first commitment value, the second commitment value and the challenge value.

4. An electronic device, comprising:
   one or more processors; and
   a memory for storing one or more programs;
   wherein when the one or more programs are executed by the one or more processors, the one or more processors is caused to realize a zero-knowledge proof method applied to a verifier, comprising the following steps of:
   acquiring a commitment parameter, public data, a first commitment value, a second commitment value and a non-interactive zero-knowledge proof, wherein the commitment parameter is generated by a trusted third party; the first commitment value and the second commitment value are obtained by selecting, by a proof sender, a data processing relationship to process private data and public data to obtain a calculation result, and committing the private data and the calculation result according to the commitment parameter, respectively; the non-interactive zero-knowledge proof is generated by the proof sender according to the data processing relationship; and
   verifying the non-interactive zero-knowledge proof according to the commitment parameter, the public data, the first commitment value and the second commitment value;
   wherein the step of selecting a data processing relationship to process private data and public data to obtain a calculation result comprises:

selecting one relationship from two data processing relationships, namely a linear relationship and a generalized multiplication relationship, as the data proc
wherein when the data processing relationship is a linear relationship, the private data is $a_i$, the public data is $b_i$, a number of data of the private data and the public data is n, and the calculation result is $c=\Sigma^n_{i=1} a_i b_i$; and
wherein when a generalized multiplication relation is selected, the private data is $d_i$, $e_i$, the public data is $x_i$, $y_i$, the number of data of the private data $d_i$ and the public data $x_i$ is $n_1$, the number of data of the private data $e_i$ and the public data $y_i$, is $n_2$, and the calculation result is $z=\Sigma^{n1}_{i=1} d_i x_i \cdot \Sigma^{n2}_{i=1} e_i y_i$,
the step of generating a non-interactive zero-knowledge proof according to the data processing relationship comprises:
generating an offset term according to the data processing relationship;
inputting the commitment parameter, the first commitment value, the second commitment value and the offset term into a random oracle machine to generate a challenge value according to the data processing relationship;
obtaining a response value by calculation according to the private data, the public data and the challenge value; and generating the non-interactive zero-knowledge proof according to the offset term and the response value.

\* \* \* \* \*